(12) United States Patent
Fitch

(10) Patent No.: US 8,031,847 B2
(45) Date of Patent: Oct. 4, 2011

(54) TRAFFIC EVALUATION SYSTEM

(75) Inventor: Philip K. Fitch, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1344 days.

(21) Appl. No.: 11/606,680

(22) Filed: Nov. 29, 2006

(65) Prior Publication Data

US 2008/0123827 A1    May 29, 2008

(51) Int. Cl.
*H04M 15/00*    (2006.01)
(52) U.S. Cl. ............... 379/112.06; 379/112.05; 379/137
(58) Field of Classification Search ........... 379/112.05–112.09, 137, 32.02, 379/133–134
See application file for complete search history.

(56) References Cited

U.S. PATENT DOCUMENTS

| | | | | |
|---|---|---|---|---|
| 4,456,788 A | * | 6/1984 | Kline et al. | 379/137 |
| 6,011,838 A | * | 1/2000 | Cox | 379/112.06 |
| 2005/0088974 A1 | * | 4/2005 | Savoor et al. | 370/235 |

* cited by examiner

*Primary Examiner* — Melur Ramakrishnaiah

(57) ABSTRACT

A system including a first client data collection device, a host server, and a host user interface. The first client data collection device can store traffic data relating to a first call market of the first client data collection device. The host server can receive the traffic data, parse the traffic data according to settings of the first client data collection device, and evaluate the parsed traffic data based on historical data corresponding to the first client data collection device. The host user interface can receive the evaluated data for displaying the health of the call market.

15 Claims, 3 Drawing Sheets

TRAFFIC EVALUATION SYSTEM

BACKGROUND INFORMATION

One of the priorities for a host company (e.g., Verizon) is to provide its users an efficient call network. The call network includes multiple markets; each market associated with callers of a particular area such as a state, a city or an area code. One or more of these markets are managed by the host company's client. These clients manage their own respective markets by monitoring usage of and collecting data about the market network without assistance from the host company. And these monitoring and data collecting techniques may be quite different from a first client to a second client, from a first market to a second market, and even from a first market to a second market managed by the same client depending on each market's characteristics, such as average number of calls for a predetermined time period, dropped calls, total number of calls, etc.

Because of these discrepancies, it can be very difficult for the host company to monitor the overall health of the call network and its corresponding markets. This hinders the host company's capability to provide an efficient call network because the host relies on the client fixing the problem or notifying them after long bureaucratic procedures. Further, even if the clients provided the host with the collected data from the markets, the host would be overwhelmed with so much information, formatted differently, that it would be nearly impossible for the host to act upon this information in an efficient manner.

DETAILED DESCRIPTION OF THE PREFERRED EMBODIMENTS

Reference will now be made in detail to the exemplary preferred embodiments implemented according to the invention, the examples of which are illustrated in the accompanying drawings. Wherever possible, the same reference numbers will be used throughout the drawings to refer to the same or like parts.

Figure 1:
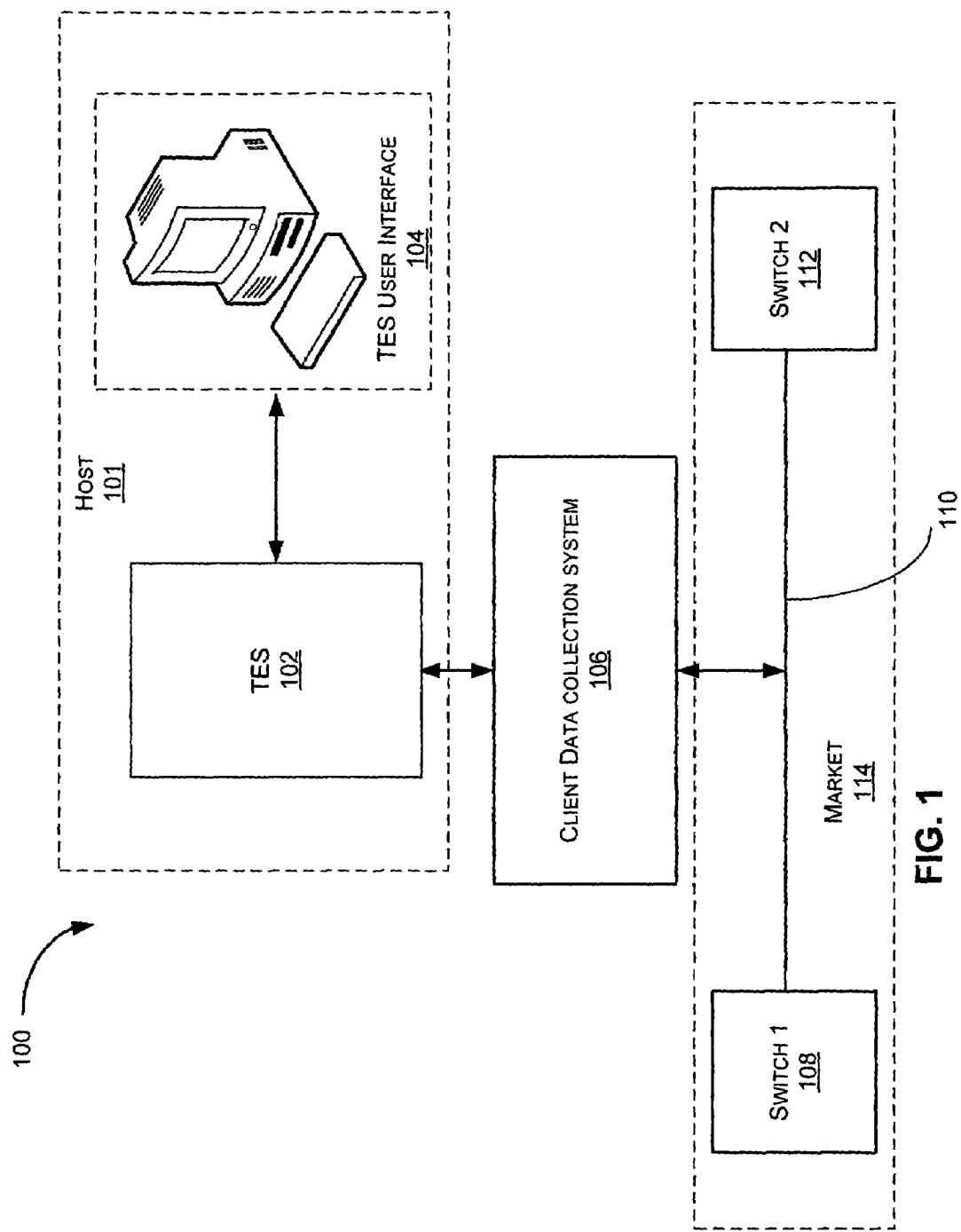
FIG. 1 is a block diagram of an exemplary traffic evaluation network.

FIG. 1 is a block diagram of an exemplary traffic evaluation network 100. Traffic evaluation network 100 can be any type of system that transmits information over a network. Traffic evaluation network 100 may include, among other things, a host 101 including a traffic evaluation system (TES) 102 and TES user interface 104, a client data collection system 106, a market 114 including switches 108, 112 and trunk 110.

Host 101 includes, among other things, TES 102 and TES user interface 104. TES 102 is one or more servers that receive data from one or more clients' data collection systems, such as a trunk data collection system, and uses this data to analyze traffic volumes and to generate trends for each respective market. Based on these volume-based trends, TES 102 can warn a TES monitoring employee at TES user interface 104 if there appears to be a problem with the monitored market 114, which can include the traffic on trunk 110 between switches 108, 112. TES 102 can also include, among other things, a processor and data storage facilities (not shown), such as a database and/or cache. These storage facilities can store the historical data for each market for future comparisons.

TES user interface 104 is a hardware and/or software device that receives information from TES 102 and provides this information to the TES monitoring employee. For example, if TES 102 and/or TES user interface 104 detect a possible error by comparing the analyzed call traffic with historical call traffic data from a previous predetermined period, TES user interface 104 could notify the TES monitoring employee that a potential problem has occurred. This notification could be a red signal for an error, yellow for a warning, green for healthy traffic, or some comparable signal protocol. For example, a red error signal could indicate that the monitored call traffic is off more than 50% from the average call traffic; a yellow warning signal could indicate that the monitored call traffic is off more than 25% from the average call traffic, and a healthy green signal could indicate that call traffic that is off less than 25% from the average call traffic. Further, TES user interface 104 can summarize each of the markets on a single display so that the TES monitoring employee is not overwhelmed with information. If a warning or error notification occurs, TES user interface 104 can provide a more detailed view for the TES monitoring employee to assist in determining the error. In some embodiments, TES 102 could automatically determine the error for the TES monitoring employee.

Client data collection system 106 is a client data storage device that collects traffic activity data for a particular market (e.g., market 114). Client data collection system 106 can be any type of data collection system that collects call traffic volume-based data. For example, client data collection system 106 can be a trunk data collection system that collects data concerning the call traffic activity on a trunk 110 between switches 108, 112. Further, client data collection system 106 is an independent system from TES 102 and potentially other client data collection systems. Client data collection system 106 includes a data storage device (archive or a database) that stores the collected data. This collected data could include data identifying call counts and their respective timing elements, market assignment, traffic type, final disposition, etc. In some embodiments, client data collection system 106 may store the collected data locally or provide its data to a data center (not shown) at a remote location for storing.

Figure 2:
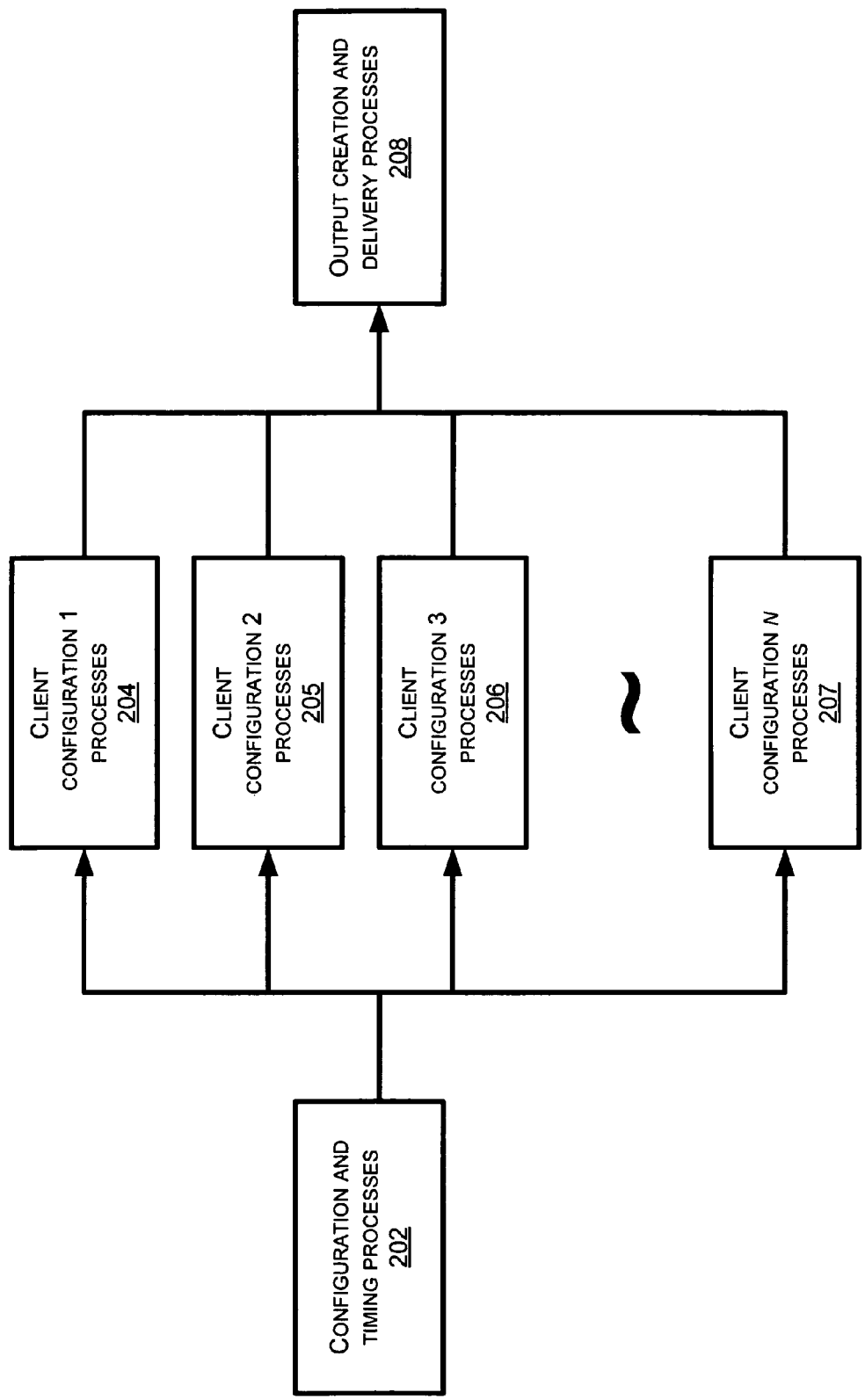
FIG. 2 is a block diagram illustrating the high level processing of a traffic evaluation network.

FIG. 2 is a block diagram illustrating a high level processing provided by TES. It will be readily appreciated by one of ordinary skill in the art that the illustrated process can be altered to delete processes or further include additional processes. In this particular embodiment, TES executes the configuration and timing processes 202, which determine when, based on a predetermined time, to access input data from a client data collection system and configure itself in preparation for the input data. The input data provided by one or more client data collections systems assist TES in determining the health of each market's call traffic within a call network system such as a PSTN, Internet, etc. The health of the market can be evaluated based on the volumetric events, such as number of units per time of day, the condition of the network, etc. Next, TES executes the client-specific configuration processes 204-207 according to the properties and settings of each client data collection system. These processes 204-207, which are further described below, can be identical or different depending upon the specifications of the client. If clients' specifications are different, TES 102 would have to integrate the information differently depending on the client's specification. For example, TES 102 could monitor call traffic through a trunk data collection system or could monitor dropped call data from a dropped call data collection system to determine the health of the call network. TES parses the input data based on these settings so that TES can process (208) the output creation and delivery.

Figure 3:
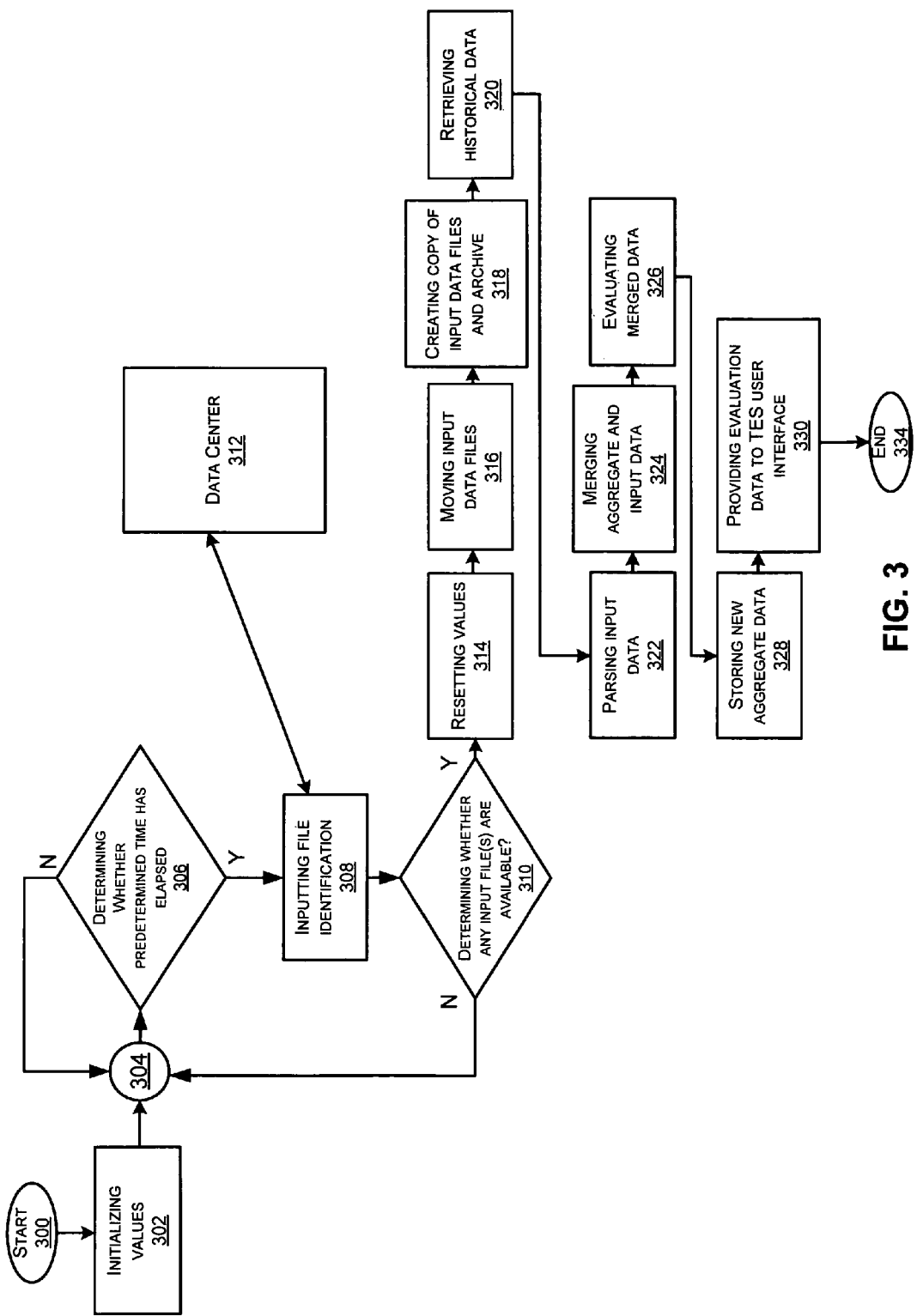
FIG. 3 is a flowchart representing an exemplary method for providing the traffic evaluation data to a traffic evaluation system (TES) user interface.

FIG. 3 is a flowchart representing an exemplary method for providing the TES processing provided in FIG. 2. It will be readily appreciated by one of ordinary skill in the art that the illustrated procedure can be altered to delete steps or further include additional steps. After initial start step 300, a TES initializes (302) the internal values stored in TES so that the internal values are reset, clearing out client sensitive counters. This can allow the TES to purge the internal values so that leftover data does not exist that may distort the health determination of a call network.

After initializing the values, TES determines (306) whether a predetermined time has been met. The predetermined time notifies TES of the time that it should access any one of the data collection systems for comparing its data to the historical data stored at TES. If the predetermined time has not been met, the method proceeds to connector 304; otherwise, TES can input (308) any file identifications from a Data Center 312 (or any other location where the data collection system has delivered the information) by creating a directory for any available input data files at a source location on the TES server. Data Center 312 is one or more centers that include TES-related and/or non-TES-related equipment and data, which provide the file identifications for the input data files. These input data files provide TES with the collected data so that TES can use this collected data to assist in determining the health of a particular portion of the call network. TES then determines (310) whether any input files were provided by the Data Center 312. If input files were not provided, the method proceeds to connector 304.

On the other hand, if input files were provided to TES, TES can reset (314) the values of variables and structures of the comparison function that will be used to determine the health of this particular call network. Resetting values can also include loading registry settings from a TES server registry and loading tables from a TES database. TES loads these tables so that they are ready to receive the input data files that were loaded in step 308. For example, these tables may include, among other things, one or more historical data tables, and tables corresponding to the variables and structures reset in step 314. The historical data table is updated each time the input files are received from the data collection system.

After resetting the values, TES moves (316) the input data files from the source location directory to an input file data location. After the input data files have been moved, the data files located at the source location can be deleted. TES can then create (318) a copy of the input data files and archive this copy. This step allows TES to manipulate the input file data without losing this data (in case of a data corruption, etc.) allowing TES the ability to re-access the input file data without having to re-request the data from data center 312. Next, TES retrieves (320) the historical data stored by the TES database. For example, TES could initialize the historical data storage of the TES database, develop a SQL query string to access the TES database for historical data, receive the historical data, and parse the historical data into a temporary storage (e.g., cache on TES).

After retrieving the historical data, TES provides the following functions based on the profile of the data collection system as referenced above for client configuration processes 204-207 of FIG. 2. First, TES parses (322) the input data files by retrieving client specific data from the TES database, parsing the input data based on the client specific settings, and storing the parsed input data in a temporary storage location (e.g., cache on TES). The parsed input data is manipulated so that the parsed input data matches the format of the historical data for comparison purposes. Next, TES merges (324) the parsed input data with the historical data. The historical data to be merged can be limited accordingly based on the specifications defined by TES. For example, historical data can include the previous 500 entries of data records that can show daily, monthly, or yearly call traffic records. Further, the historical data can include individual values associated with each element, such as DAY1=10 calls, DAY2=5 calls, DAY3=7 calls, etc. In some embodiments, the temporary storage can be deleted after the merger. Then, TES evaluates (326) the merged data based on each market element of a plurality of markets. This evaluation can provide data that compares the "current" merged input data with the historical data of each market. By comparing this data for each market, TES can assist a TES monitoring employee in determining the health of each market of the entire call network so that issues can be taken care of before they become serious problems.

For example, TES could have a predetermined threshold set for both warning and error fields, wherein these thresholds can be adjusted accordingly to the preferences of the TES monitoring employee. The warning threshold could be 25% above/below the average number of calls for a particular period of time on the corresponding element while the error threshold could be 50% above/below the average number of calls. If the average number of calls on a network is 100,000 calls for a predetermined time period, a determination of 70,000 calls would trigger a warning signal to be transmitted to the TES monitoring employee. This warning would allow the TES monitoring employee the ability to contact someone to fix the problem, which may be a faulty switch, etc. Or if the particular market is getting too busy, the TES monitoring employee could contact someone to remedy this situation by separating the market accordingly into multiple sub-markets that may relieve the pressure on the system monitoring the market. In some embodiments, the warning threshold could be based on a specific number of calls over the average for a particular time period. Further, in the event that multiple markets suddenly show warning messages, a TES monitoring employee could determine that there is a problem with the client if these markets are associated with that particular client.

After the evaluation for the one or more markets, the TES stores (328) the parsed input data into the original historical data creating the new historical data for future comparisons. After the storing, the TES provides (330) the evaluation data to the TES user interface allowing the TES monitoring employee to monitor the health of each market within the call network. In some embodiments, TES can provide this evaluation data through a web server, which can transfer the data to a TES user interface over the Internet. If a problem occurs with the health of the call network, the evaluation data may assist the TES monitoring employee to pinpoint the problem. For example, the TES user interface may indicate that 50 different markets are suddenly in the warning phase. The TES monitoring employee can look for a common thread for the error; whether it is the common area (e.g., state or area code) for the different markets, or a common client. After TES provides the evaluation data, the method can then proceed to end 332.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive sense. Other embodiments of the invention may be apparent to those skilled in the art from consideration of the specification and practice of the embodiments disclosed herein.

What is claimed is:

1. A system comprising:
    a first client data collection device configured to store traffic data relating to a first call market managed by a first client;
    a second client data collection device configured to store traffic data relating to a second call market managed by a second client;
    a host server configured to:
        receive traffic data from either the first client data collection device or the second client data collection device,
        parse the traffic data according to either settings of the first client data collection device or settings of the second client data collection device, respectively, and
        evaluate the parsed traffic data based on historical data corresponding to either the first client data collection device or the second client data collection device, respectively; and
    a host user interface configured to receive the evaluated data for displaying the health of either the first call market or the second call market.

2. The system of claim 1, wherein the settings of the first client data collection device are different from the settings of the second client data collection device.

3. The system of claim 1, wherein the host user interface receives the evaluated data from both the first and second client data collection devices for displaying the health of the first and second call markets.

4. The system of claim 1, wherein the host user interface provides a notification for informing a host monitoring employee of the health of the call market, wherein different signals indicate a healthy market, a deteriorating market, or an unhealthy market.

5. A method performed by a host server including one or more computers, the method comprising:
    receiving call traffic data that corresponds to either a first client data collection device or a second client data collection device, wherein the first client data collection device is configured to store traffic data relating to a first call market managed by a first client and a second client data collection device is configured to store traffic data relating to a second call market managed by a second client;
    parsing the call traffic data according to settings of either the first client data collection device or the second client data collection device, respectively; and
    evaluating the parsed traffic data based on historical data corresponding to either the first client data collection device or the second client data collection device, respectively, wherein the evaluated data is configured to be provided to a user interface to determine the health of either the first call market or the second call market, respectively.

6. The method of claim 5, further comprising combining the parsed traffic data with the historical data and storing the combined historical data for future evaluations.

7. The method of claim 5, wherein receiving the call traffic data is based on whether a predetermined threshold has been met.

8. The method of claim 5,
    wherein the settings of the second client data collection device are different from the settings of the first client data collection device.

9. A host server comprising:
    one or more storage locations configured to store first historical data of a first call market managed by a first client, and second historical data of a second call market managed by a second client, and at least one of first call traffic data relating to the first call market or second call traffic data relating to the second call market; and
    a processor configured to:
        parse either the first call traffic data or the second call traffic data according to either first settings provided by a first client data collection device associated with the first call market or second settings provided by a second client data collection device associated with the second call market, respectively, and
        evaluate the parsed first traffic data or the parsed second traffic data based on either the stored first historical data or the stored second historical data, respectively, wherein the evaluated data is configured to be provided to a user interface for displaying the health of the first market or the second market, respectively.

10. The host server of claim 9, wherein the one or more storage locations store combined historical data for future evaluations, wherein the combined historical data is the call traffic data combined with the respective historical data.

11. The host server of claim 9, wherein the first settings of the first client data collection device can be different from the second settings of the second client data collection device.

12. A computer readable medium storing instructions that, when executed by a computer, causing the computer to perform a method for evaluating a market's health, the method comprising:
    receiving call traffic data that corresponds to either a first client data collection device or a second client data collection device, wherein the first client data collection device is configured to store traffic data relating to a first call market managed by a first client and a second client data collection device is configured to store traffic data relating to a second call market managed by a second client;
    parsing the call traffic data according to settings of either the first client data collection device or the second client data collection device; and
    evaluating the parsed traffic data based on historical data corresponding to either the first client data collection device or the second client data collection device, wherein the evaluated data is configured to be provided to a user interface to determine the health of either the first call market or the second call market.

13. The method of claim 12, further comprising combining the parsed traffic data with the historical data and storing the combined historical data for future evaluations.

14. The method of claim 12, wherein receiving the call traffic data is based on whether a predetermined threshold has been met.

15. The method of claim 12, wherein the settings of the second client data collection device are different from the settings of the first client data collection device.

* * * * *